US008041330B1

(12) United States Patent
Garin (10) Patent No.: US 8,041,330 B1
(45) Date of Patent: Oct. 18, 2011

(54) WIRELESS DEVICE CAPABLE OF PRODUCING AN EMERGENCY BEACON

(75) Inventor: Lionel Jacques Garin, Palo Alto, CA (US)

(73) Assignee: SiRF Technology Inc., San Jose, CA (US)

( * ) Notice: Subject to any disclaimer, the term of this patent is extended or adjusted under 35 U.S.C. 154(b) by 531 days.

(21) Appl. No.: 10/251,274

(22) Filed: Sep. 19, 2002

Related U.S. Application Data

(60) Provisional application No. 60/323,800, filed on Sep. 19, 2001.

(51) Int. Cl.
*H04M 11/00* (2006.01)
(52) U.S. Cl. ............... 455/404.1; 455/414.1; 455/456.1; 342/386
(58) Field of Classification Search .... 455/456.1–456.6, 455/404.2; 342/357.09; 340/309.5; 175/61
See application file for complete search history.

(56) References Cited

U.S. PATENT DOCUMENTS

| | | | | |
|---|---|---|---|---|
| 5,697,067 A * | 12/1997 | Graham et al. | ............... | 455/523 |
| 6,011,510 A * | 1/2000 | Yee et al. | ................. | 342/357.09 |
| 6,011,974 A * | 1/2000 | Cedervall et al. | .......... | 455/456.4 |
| 6,018,659 A * | 1/2000 | Ayyagari et al. | ............... | 455/431 |
| 6,249,252 B1 * | 6/2001 | Dupray | ......................... | 342/450 |
| 6,298,306 B1 * | 10/2001 | Suarez et al. | ................. | 701/213 |
| 6,314,281 B1 * | 11/2001 | Chao et al. | ................. | 455/404.2 |
| 6,771,163 B2 * | 8/2004 | Linnett et al. | ............. | 340/309.5 |
| 2001/0026240 A1 * | 10/2001 | Neher | ....................... | 342/357.07 |
| 2003/0006071 A1 * | 1/2003 | Stump et al. | .................... | 175/61 |
| 2004/0002346 A1 * | 1/2004 | Santhoff | ................... | 455/456.1 |

* cited by examiner

*Primary Examiner* — Phuoc Doan
(74) *Attorney, Agent, or Firm* — RatnerPrestia (57) ABSTRACT

A wireless device capable of producing an emergency beacon signal is disclosed. The wireless device has a radio portion and may include a beacon transmitter and a controller in signal communication with the radio portion and beacon transmitter. The controller is capable of instructing the beacon transmitter to transmit a beacon location signal in response to the radio portion receiving a beacon activation signal. The wireless device may further include a satellite position system ("SPS") receiver in signal communication with the controller.

43 Claims, 7 Drawing Sheets

WIRELESS DEVICE CAPABLE OF PRODUCING AN EMERGENCY BEACON

CROSS-REFERENCE TO RELATED APPLICATIONS

This application claims the benefit of provisional patent application Ser. No. 60/323,800, filed on Sep. 19, 2001, and entitled "WIRELESS HANDSET USED AS A PERSONAL EMERGENCY BEACON," which is herein incorporated.

BACKGROUND OF THE INVENTION

1. Field of the Invention

This invention relates generally to the field of wireless communications. In particular, the invention relates to wireless communication systems capable of providing an emergency beacon.

2. Related Art

Disasters and emergency situations are unpleasant events that have affected humanity throughout history. They range from natural disasters to individual emergencies. Occasionally, they involve individuals being trapped underneath materials such as sand, rubble, snow and mud in situations involving sand storms, crumbling structures, avalanches or mudslides, respectively. Typically, these are examples of life threatening situations and any device capable of providing quick and accurate location of a person trapped in these types of situations will greatly improve the chances of rescue and survival of the person.

Past attempts to satisfy this need have included utilizing an emergency beacon device. However, emergency beacon devices are very specialized devices that are typically found only in military and commercial equipment such airplanes and marine vessels. Emergency beacon devices are not readily available for utilization by individuals. Therefore there is a need for a device capable of providing this type of information that is available to individuals.

The worldwide utilization of wireless devices such as two-way radios, pagers, portable televisions, personal communication system ("PCS"), personal digital assistants ("PDAs") cellular telephones (also known a "mobile phones"), Bluetooth, satellite radio receivers and Satellite Positioning Systems ("SPS") such as Global Positioning Systems ("GPS"), also known as NAVSTAR, is growing at a rapid pace. As the number of people employing wireless devices increases, the number of features offered by wireless service providers also increases, as does the integration of these wireless devices in other products.

The number of features offered by wireless service providers is increasingly matching the features offered by traditional land-line telephone service providers. Features such as call waiting, call forwarding, caller identification ("caller I.D."), three-way calling, data transmission and others are commonly offered by both land-line and wireless service providers. These features generally operate in the same manner on both wireless devices and land-line telephones.

Presently, emergency beacons are not available in wireless devices but an attempt at providing location information of a wireless device user in an emergency situation is the Enhanced 911 (also known as E911) service. E911 is an example of an approach of providing a location of a person utilizing a cellular telephone in an emergency situation in, a similar fashion that a 911 service call (normally referred to as a "911" call) does on a land-line telephone. However, E911 operate differently on wireless devices than a 911 service call does on land-line telephones.

When a 911 call is placed from a land-line telephone, the 911 reception center receives the call and determines the origin of the call. In case the caller fails, or forgets, to identify his or her location, the 911 reception center is able to obtain the location from which the call was made from the land-line telephone switching network and send emergency personnel to the location of the call.

If instead, an E911 call is placed from a wireless device such as a cellular telephone, the E911 reception center receives the call but cannot determine the origin of the call. If the caller fails, or forgets, to identify his or her location, the E911 reception center is unable to obtain the location of the call because the mobile switching network is different than the land-line telephone switching network. At present, the best that the E911 reception center may possibly do is determine the location of the basestation corresponding to the cell from which the call was placed. Unfortunately, typical cells in a cellular network system may cover an area with approximately a 30 mile diameter.

However, the United States Congress, through the Federal Communications Commission (FCC), has enacted a requirement that cellular telephones be locatable to within 50 feet once an emergency call, such as an E911, is placed by a given cellular telephone. This type of position data would assist police, paramedics, and other law enforcement and public service personnel, as well as other agencies that may need to have legal rights to determine the position of specific cellular telephone. Therefore, there is a need for a system that determines the location of a wireless device within 50 feet once an emergency call such as an E911 is placed by a given wireless device such as a cellular telephone.

A proposed solution to this problem has been to utilize a wireless positioning system that includes satellites and/or pseudolites (such as basestations) to triangulate the position of a wireless device such as a cellular telephone. GPS is an example of a SPS that may be utilized by a wireless device in combination with an appropriate GPS receiver to pinpoint the location of the wireless device on earth. The array of GPS satellites transmits highly accurate, time coded information that permits a receiver to calculate its exact location in terms of latitude and longitude on earth as well as the altitude above sea level. The GPS system is designed to provide a base navigation system with accuracy to within 100 meters for non-military use and greater precision for the military (with Selective Availability ON).

The space segment of the GPS system is a constellation of satellites orbiting above the earth that contain transmitters, which send highly accurate timing information to GPS receivers on earth. The fully implemented GPS system consists of 21 main operational satellites plus three active spare satellites. These satellites are arranged in six orbits, each orbit containing three or four satellites. The orbital planes form a 55° angle with the equator. The satellites orbit at a height of 10,898 nautical miles (20,200 kilometers) above earth with orbital periods for each satellite of approximately 12 hours.

Each of the orbiting satellites contains four highly accurate atomic clocks. These provide precision timing pulses used to generate a unique binary code (also known as a pseudo random or pseudo noise "PN" code) that is transmitted to earth. The PN code identifies the specific satellite in the constellation. The satellite also transmits a set of digitally coded ephemeris data that completely defines the precise orbit of the satellite. The ephemeris data indicates where the satellite is at any given time, and its location may be specified in terms of the satellite ground track in precise latitude and longitude measurements. The information in the ephemeris data is coded and transmitted from the satellite providing an accurate indication of the exact position of the satellite above the earth at any given time. A ground control station updates the ephemeris data of the satellite once per day to ensure accuracy.

A GPS receiver configured in a wireless device is designed to pick up signals from three, four, or more satellites simultaneously. The GPS receiver decodes the information and, utilizing the time and ephemeris data, calculates the approximate position of the wireless device. The GPS receiver contains a floating-point processor that performs the necessary calculations and may output a decimal display of latitude and longitude as well as altitude on the handset. Readings from three satellites are necessary for latitude and longitude information. A fourth satellite reading is required in order to compute altitude.

However, while E911 approaches are a beginning in the attempt of determining the location of a wireless device user, the 50 foot accuracy required by the FCC is not accurate enough for an emergency beacon application because a person may be trapped beneath a type of life threatening material such as sand, rubble, earth, snow or mud that requires immediate rescue. Additionally, E911 solutions require the wireless device user to actively select the E911 service. However, in many emergency situations the wireless device user may be trapped or injured in a way that the wireless device user will not be able to actively activate any type of service including E911.

Therefore, there is a need for a system capable of producing an emergency beacon signal in a wireless device that is accurate and capable of being activated even if the wireless device user is incapacitated. Moreover, there is a need for system capable of producing an emergency beacon signal in a wireless device for an extended period of time on a typically wireless device power source such as a battery.

SUMMARY

A wireless device capable of producing an emergency beacon signal is disclosed. The wireless device has a radio portion and may include a beacon transmitter and a controller in signal communication with the radio portion and beacon transmitter. The controller is capable of instructing the beacon transmitter to transmit a beacon location signal in response to the radio portion receiving a beacon activation signal. The wireless device may further include a satellite position system ("SPS") receiver in signal communication with the controller. The SPS receiver is capable of determining a position of the wireless device and the beacon transmitter is capable of transmitting the determined position of the wireless device.

As an example of operation, the wireless device may receive a beacon activation signal with the radio portion and transmit the beacon location signal in response to receiving the beacon activation signal. The wireless device may also receive SPS data with a SPS receiver, determine a position of the wireless device with the SPS receiver and transmit the determined position of the wireless device.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

A typical satellite positioning system ("SPS") system has approximately 12 satellites that may be visible at any one time to a wireless device. SPS means any system utilizing satellites and/or land-based communications devices for providing or enabling the determination of a location of the wireless device on the earth, for example but not limited to: the global positioning system ("GPS") known as NAVSTAR, GLONASS, LORAN, Shoran, Decca, or TACAN.

Figure 1:
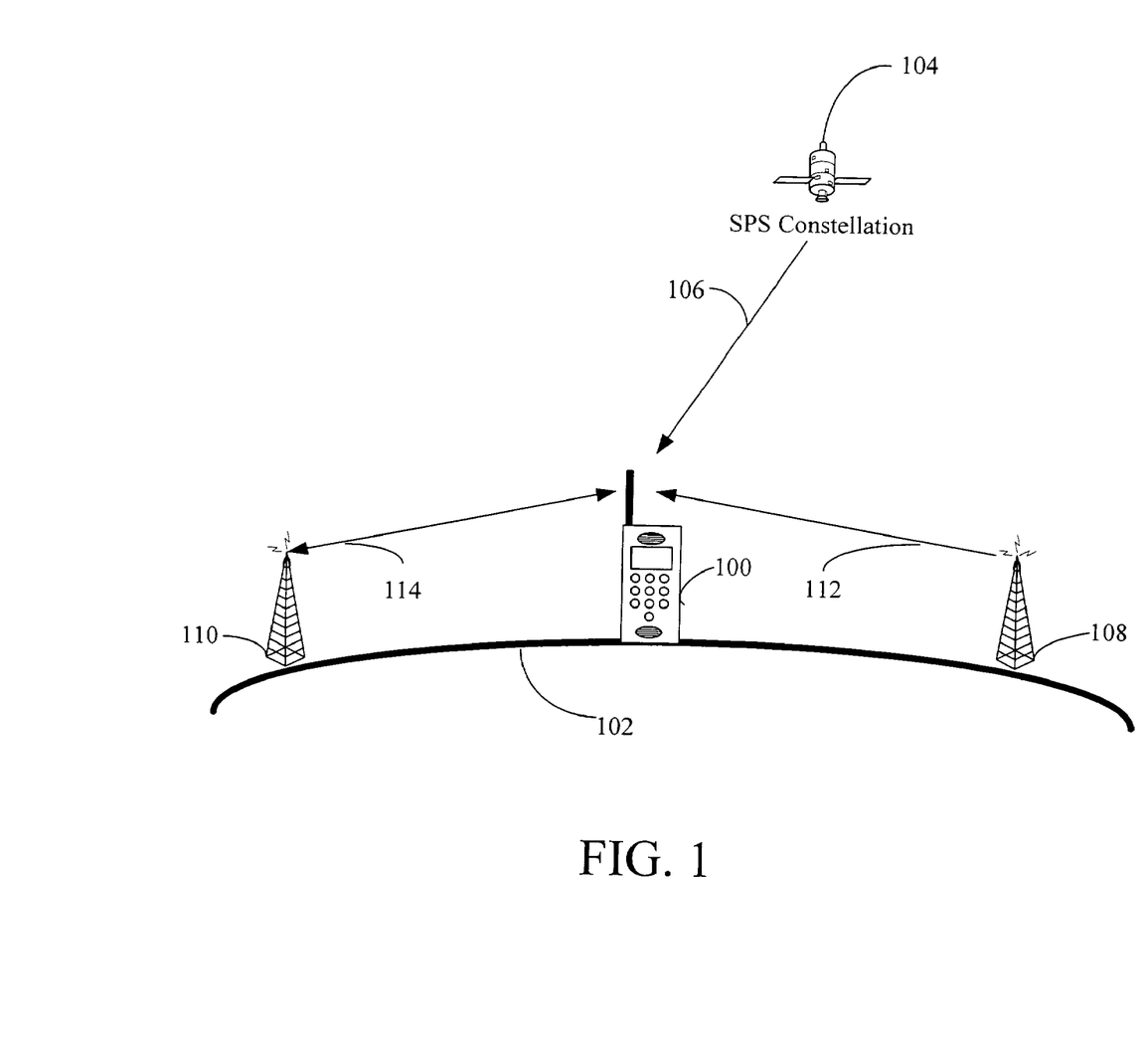
FIG. 1 illustrates a schematic diagram of a wireless device receiving positional information from a plurality of satellites and pseudolites.

In FIG. 1, a wireless device 100 (such as a mobile or cellular telephone), having a satellite position system ("SPS") receiver, on the surface of the earth 102 receives positional information from a plurality of satellites and pseudolites (such as base stations) in typical non-emergency operation. A SPS constellation of satellites 104 is shown transmitting to the wireless device 100 via signal path 106. FIG. 1 also shows pseudolites (base stations) 108 and 110 transmitting to the wireless device 100 via signal paths 112 and 114, respectively.

As an example, the wireless device 100 may be a cellular telephone (also known as a "mobile phone") or personal digital assistant ("PDA") and the base stations 108 and 110 may be in communication with a radio portion (not shown) of the wireless device 100. The base stations 108 and 110 may communicate with the radio portion and/or provide the radio portion with SPS aiding information.

Figure 2:
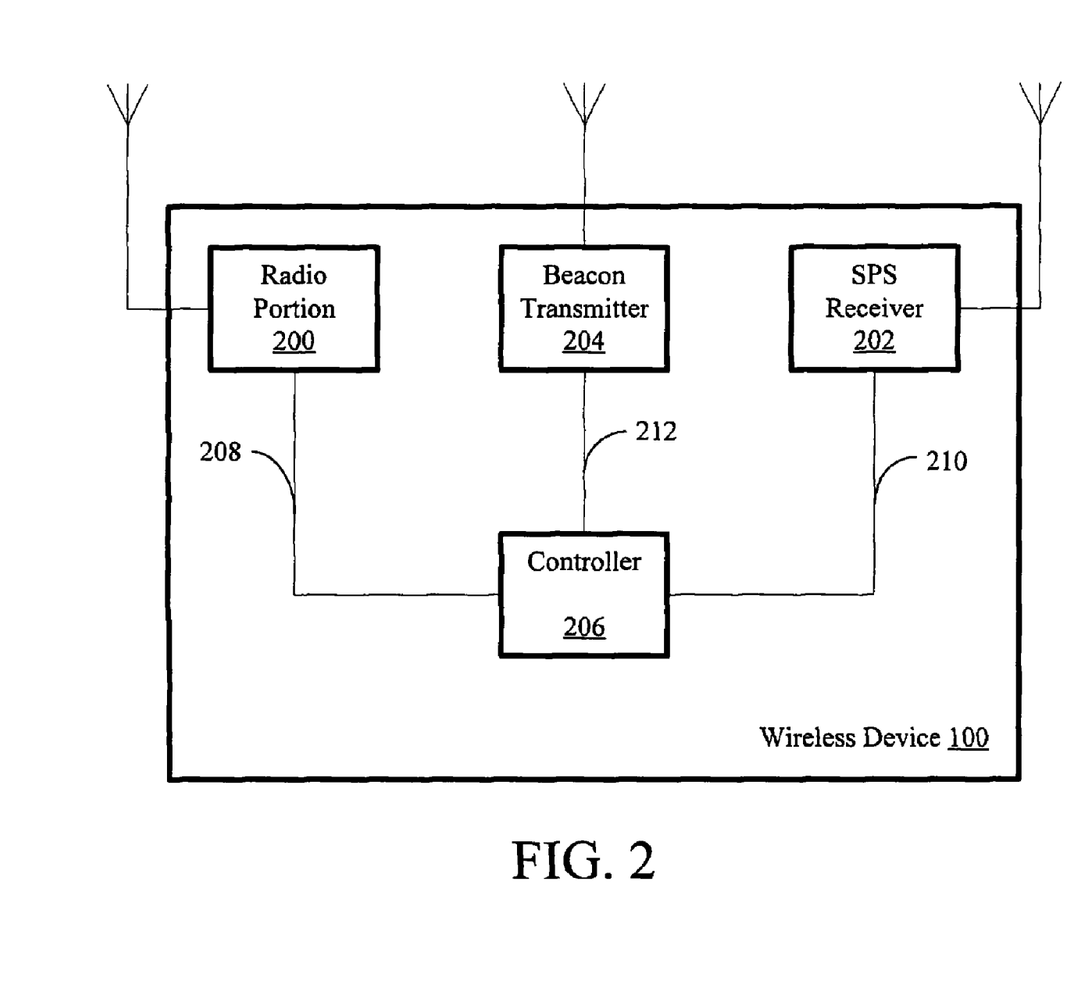
FIG. 2 shows a block diagram of an example implementation of the wireless device shown in FIG. 1.

FIG. 2 shows a block diagram of an example implementation of the wireless device 100. The wireless device 100 may include a radio portion 200, SPS receiver 202, beacon transmitter 204 and controller 206. The controller 206 is in signal communication with the radio portion 200, SPS receiver 202 and beacon transmitter via signal paths 208, 210 and 212, respectively. The radio portion 200 include an radio frequency ("RF"), AMPS, code division multiple accesses ("CDMA"), CDMA-2000, W-CDMA, time division multiple access ("TDMA"), frequency division multiple access ("FDMA"), global service for mobile communication ("GSM"), or universal mobile telephone service ("UMTS") type transceiver. The SPS receiver 202 may be a GPS receiver such at the SiRFstarI, SiRFstarII and SiRFstarIII GPS receiver produced by SiRF Technology, Inc. of San Jose, Calif., GPSOne GPS receiver produced by Qualcomm Incorporated of San Diego, Calif., or any other GPS receiver capable of operation within the wireless device 100. The SPS receiver 202 may be controlled by SPS software that may be reside in a memory unit (not shown) optionally located within the SPS receiver 202 or external to the SPS receiver 202. The beacon transmitter 204 may be an ultra wide band transmitter capable of operating at ultra wide band frequencies such as, for example, 10 megahertz, 50 megahertz and/or 100 megahertz.

The controller 206 may be any type of microprocessor, micro controller capable of activating the transmission of a beacon signal from the beacon transmitter 204 or the radio portion 200. It is appreciated by those skilled in the art that the radio portion 200 may also be capable of sending a beacon signal in response the commands from the controller 206. The controller 206 may be programmable by software (not shown) located in a memory unit (not shown) that may be optionally located within the controller 206 or external to the controller 206.

Figure 3:
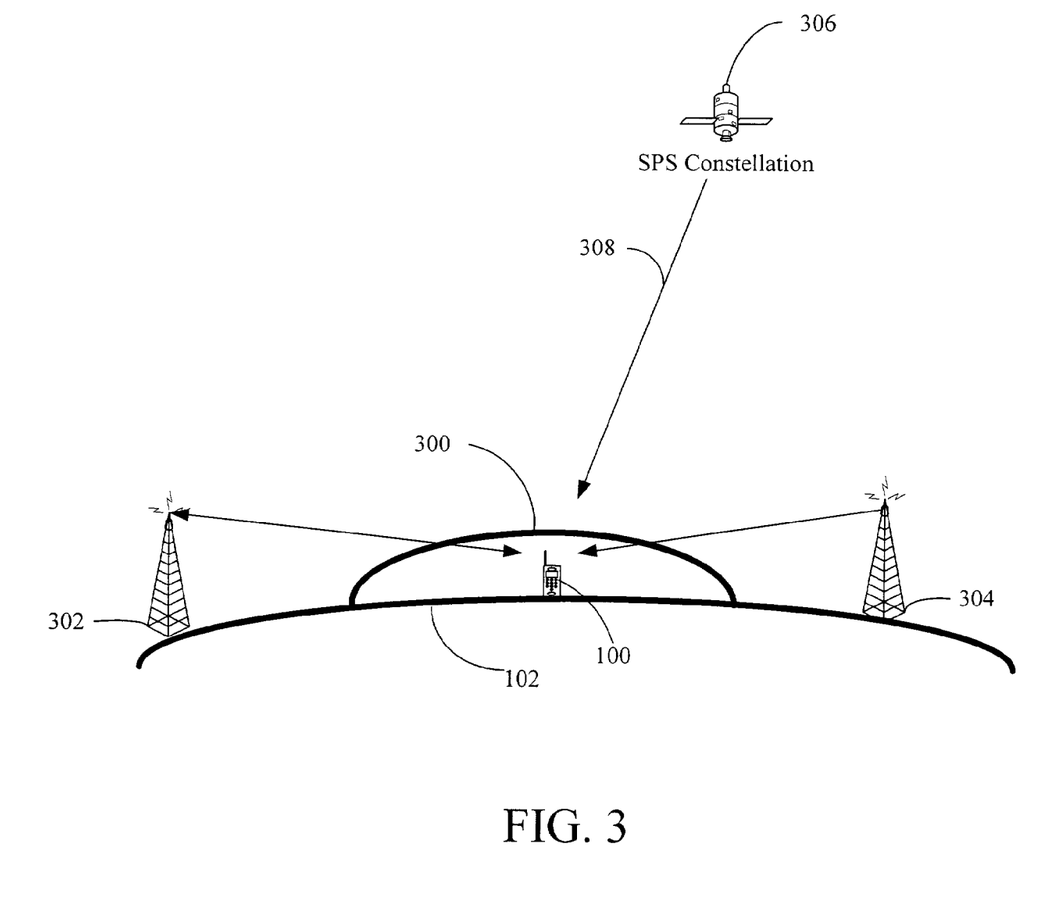
FIG. 3 illustrates a schematic diagram of the wireless device shown in FIG. 1 in an example emergency situation where the wireless device is trapped under material.

In FIG. 3, a schematic diagram of the wireless device 100 is shown in an example emergency situation where the wireless device 100 is trapped under some type of material 300. The emergency situation may have be the result of a wireless device 100 user (not shown) becoming incapacitated in an emergency such as a skiing accident or being trapped in a collapsed structure such as building or cave. In this situation, a rescue party will be sent to locate the wireless device 100 user. However, based on how the user is trapped it may be very difficult to find the user under the material 300 in time to save the life of the user. An approach to solve this problem is for a base station (either 302, 304 or both) to transmit a beacon activation signal on the broadcast channel to the radio portion 200 of the wireless device 100. The beacon activation signal may be a special message that switches all wireless devices (not shown) in the immediate area from a standby mode into an emergency mode. In the emergency mode, the wireless device 100 may transmit a beacon location signal from the radio portion 200 and/or the beacon transmitter 204. The beacon location signal may include the positional information of the wireless device 100 that was determined by the SPS receiver 202. If the beacon location signal is transmitted by the radio portion 200, it may be transmitted to the base stations 302 and 304 on the standard communication channels utilized by the radio portion 200. If, instead, the beacon location signal is transmitted by the beacon transmitter 204, it may be transmitted to special ultra wide band receivers (not shown) by utilizing an ultra wide band channel. The beacon location signal may be an ultra wide band signal such as the frequencies 10-megahertz, 100-megahertz and 500-megahertz.

Figure 4:
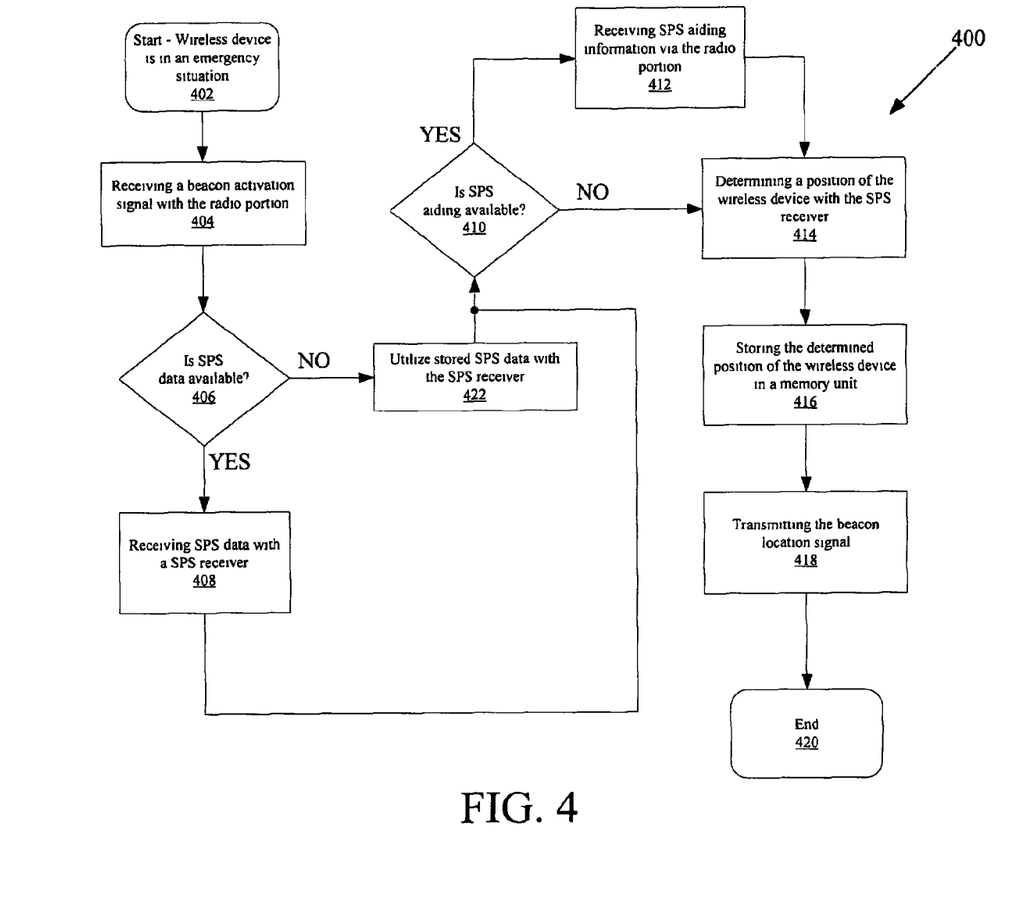
FIG. 4 is a flow chart illustrating an example process performed by the wireless device shown in FIG. 3 in an emergency situation.

In FIG. 4, a flow chart 400 is shown illustrating an example process performed by the wireless device 100 in an emergency situation. The process begins 402, and the wireless device 100 receives a beacon activation signal with the radio portion 200 in step 402. If the wireless device 100 is capable of receiving SPS data in decision step 406, the process continues to step 408. In step 408, the wireless device 100 receives the SPS data with the SPS receiver and the process continues to decision step 410. In decision step 410, if aiding from a network is available (such as from the base stations 302 and 304), the process continues to step 412. In step 412, the wireless device 100 receives SPS aiding information from the network via the radio portion 200 and the process continues to step 414. In step 414, the SPS receiver 202 determines a position of the wireless device 100 and the position is stored in a memory unit in step 416. The wireless device 100 then transmits the position information via a beacon location signal transmitted from either the beacon transmitter 204 or radio portion 200 in step 418. After this the process end 420. If, instead, in decision step 410 aiding from a network is not available, the process continues to step 414. The process then continues through steps 416 to 420. Similarly, if instead, in decision step 406, the SPS data is not available, the wireless device 100 in step 422 utilizes the stored SPS data values from a previous SPS acquisition and the process continues from step 410 through 420.

Figure 5:
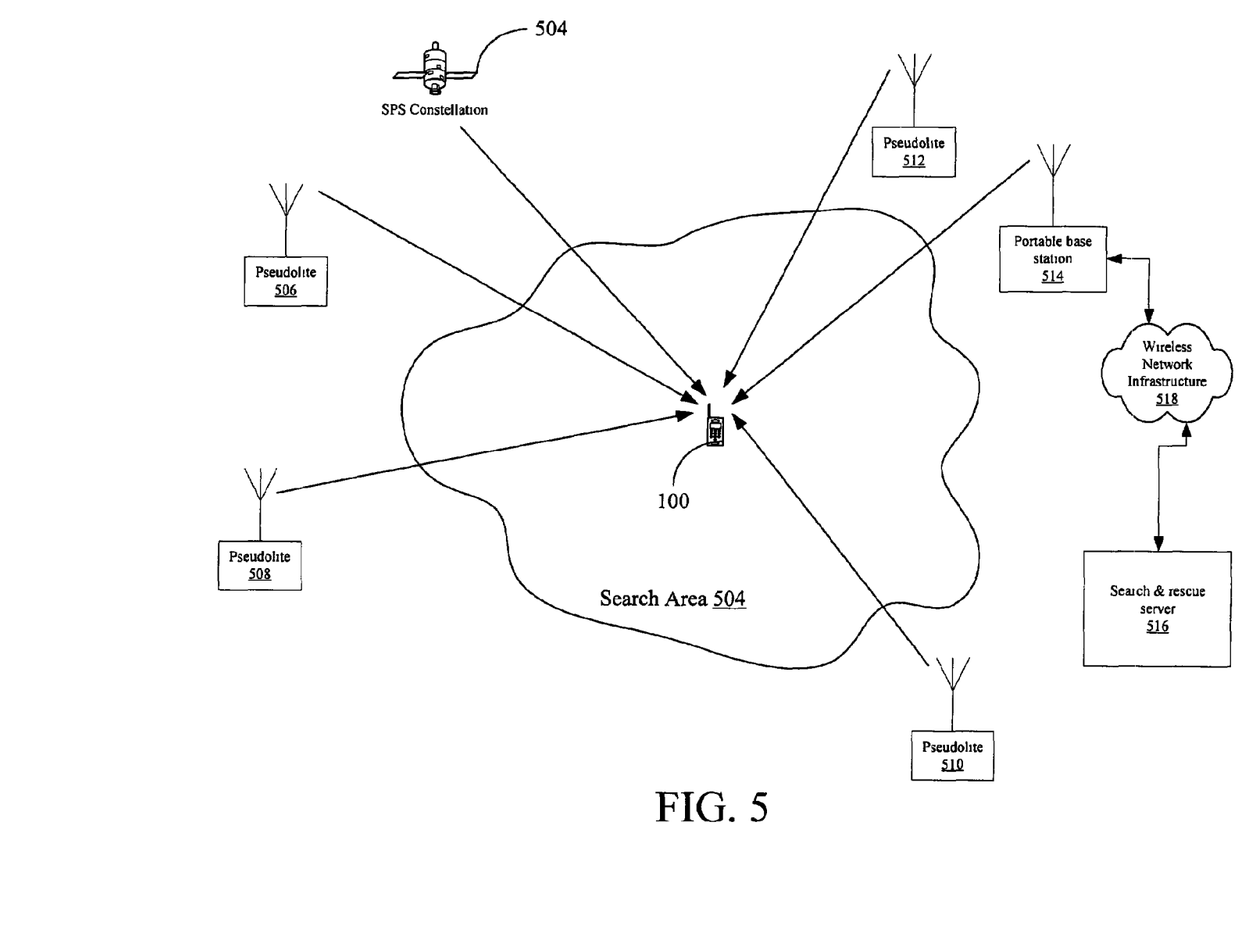
FIG. 5 is an example setup to locate the wireless device of FIG. 3 in an emergency situation within a search area utilizing the SPS constellation, four pseudolites, and a portable base station in signal communication with search and rescue geolocation server.

In FIG. 5, an example setup 500 is shown to locate the wireless device 100 in an emergency situation within a search area 500 utilizing the SPS constellation 504, four pseudolites 506, 508, 510 and 512, and a portable base station 514 in signal communication with search and rescue geolocation server 516. The search and rescue geolocation server 516 is in signal communication with the portable base station 514 via the wireless network infrastructure 518. In this example setup, several portable high powered SPS pseudolites 506, 508, 510 and 512 are closely set up to the search area 502. Each SPS pseudolite operates as if it were a SPS satellite on the ground. Each SPS pseudolite broadcasts a fixed position in its ephemeris message that is the position of the individual SPS pseudolite. Each individual SPS pseudolite transmits a GPS type of pseudorandom noise ("PN") sequence that is different from all the reserved PN sequence of the real satellites in the satellite constellation 504. The SPS pseudolites 506, 508, 510 and 512 may each transmit in time multiples that have short transmission power duty cycles on top of the CDMA mode. This would allow the reception of other satellites of pseudolite during a "transmission off" time.

The portable base station 514 may broadcast a special message (the beacon activation signal) on the broadcast channel that switches all wireless device within the search area 502 to an emergency mode of operation. In the emergency mode, the wireless device 100 may be configured to receive the transmissions from the pseudolites, interrogated to provide its position and/or geolocation measurement. This information may be organized and processed by the search and rescue geolocation server 516 and when coupled with differential correction, this process should lead to a very accurate positioning of the wireless device 100.

Figure 6:
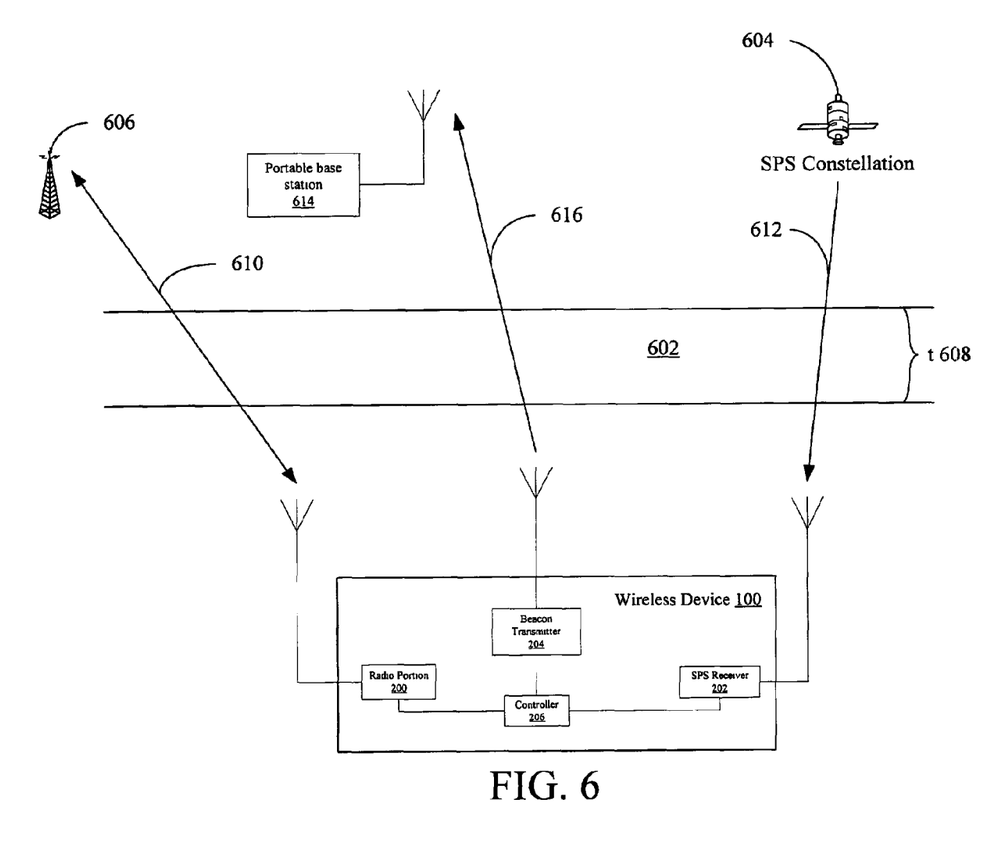
FIG. 6 is a schematic diagram of the wireless device operating in an emergency situation under a thick layer of material.

FIG. 6 is a schematic diagram 600 of the wireless device 100 operating in an emergency situation under a thick layer of material 602. Similar to FIG. 5, the wireless device 100 attempts to communicate with the SPS constellation 604 and base station 606. In FIG. 6, the material 602 has a thickness "t" 608. The thickness t 608 is proportional to the amount of attenuation that communication signals from the radio portion 200 to the base station 606 (signal 610), from the SPS constellation 604 to the SPS receiver 202 (signal 612) and from the beacon transmitter 204 to a portable base station 614 (signal 616) will experience.

Typically the material 602 may be sand, soil, rock, concrete, mud or other types of similar substances. In general, the electrical conductivity of these materials determines the depth of penetration (i.e., the thickness t 608) of electromagnetic ("EM") signals in these materials. Typically, high conductivity results in limited penetration while low conductivity results in greater penetration. It is appreciated by those skilled in the art, that the depth of penetration may be determined by a combination of the Helmholtz scalar wave equation $$\psi = \frac{e^{-j\beta r}}{4\pi r},$$

where $\beta = 2\pi f \sqrt{\mu \epsilon'}$, $$\epsilon' = \epsilon - j\frac{\sigma}{2\pi f},$$

f is the frequency of operation, σ is the conductivity of the material, μ is the permeability of the material and ε is the permittivity of the material, with the ground penetrating radar ("GPR") range equation $$Q = 10 \log\left(\frac{E_t E_r G_t G_r v_m^2 g e^{-4\alpha R} q}{64\pi^3 f^2 R^4}\right),$$

where Q is the performance factor, $E_t$ and $E_r$ are the antenna efficiency, $G_t$ and $G_r$ are the antenna gain, f is the frequency of operation, R is the distance from the antenna, $v_m$ is the velocity of propagation in the material, α is the attenuation coefficient of the material, g is the back scatter gain of the target in the material and q is the scattering cross-section area.

Table 1 illustrates the electromagnetic properties of a number of materials at 100-megahertz operating frequency.

TABLE 1

| Material | Relative Permittivity | Conductivity (Siemens/meter) | Velocity (cm/ns) | Attenuation (dB/m) |
|---|---|---|---|---|
| Air | 1 | 0 | 30 | 0 |
| Granite, dry | 5 | $10^{-7}$-$10^{-6}$ | 13 | $10^{-4}$-$10^{-3}$ |
| Granite, wet | 7 | $10^{-4}$-$10^{-3}$ | 11 | 0.06-0.6 |
| Rock salt, dry | 4 | $10^{-4}$ | 15 | 0.08 |
| Sandy soil, dry | 4 | $10^{-5}$-$10^{-3}$ | 15 | 0.008-0.8 |
| Fresh water | 81 | $10^{-3}$ | 3.33 | 0.18 |
| Sandstone, wet | 6-10 | $10^{-5}$-$10^{-3}$ | 12->9 | 0.007-0.5 |
| Concrete, dry | 4-1- | $10^{-3}$-$10^{-2}$ | 15->9 | 0.8-5 |
| Loamy soil, wet | 10-2- | $10^{-2}$-$10^{-1}$ | 9->6 | 5-34 |
| Clayey soil, wet | 15-25 | $10^{-1}$-1 | 7->3 | 40-160 |
| Sea water | 81 | 4 | 1.5 | 326 |

Figure 7:
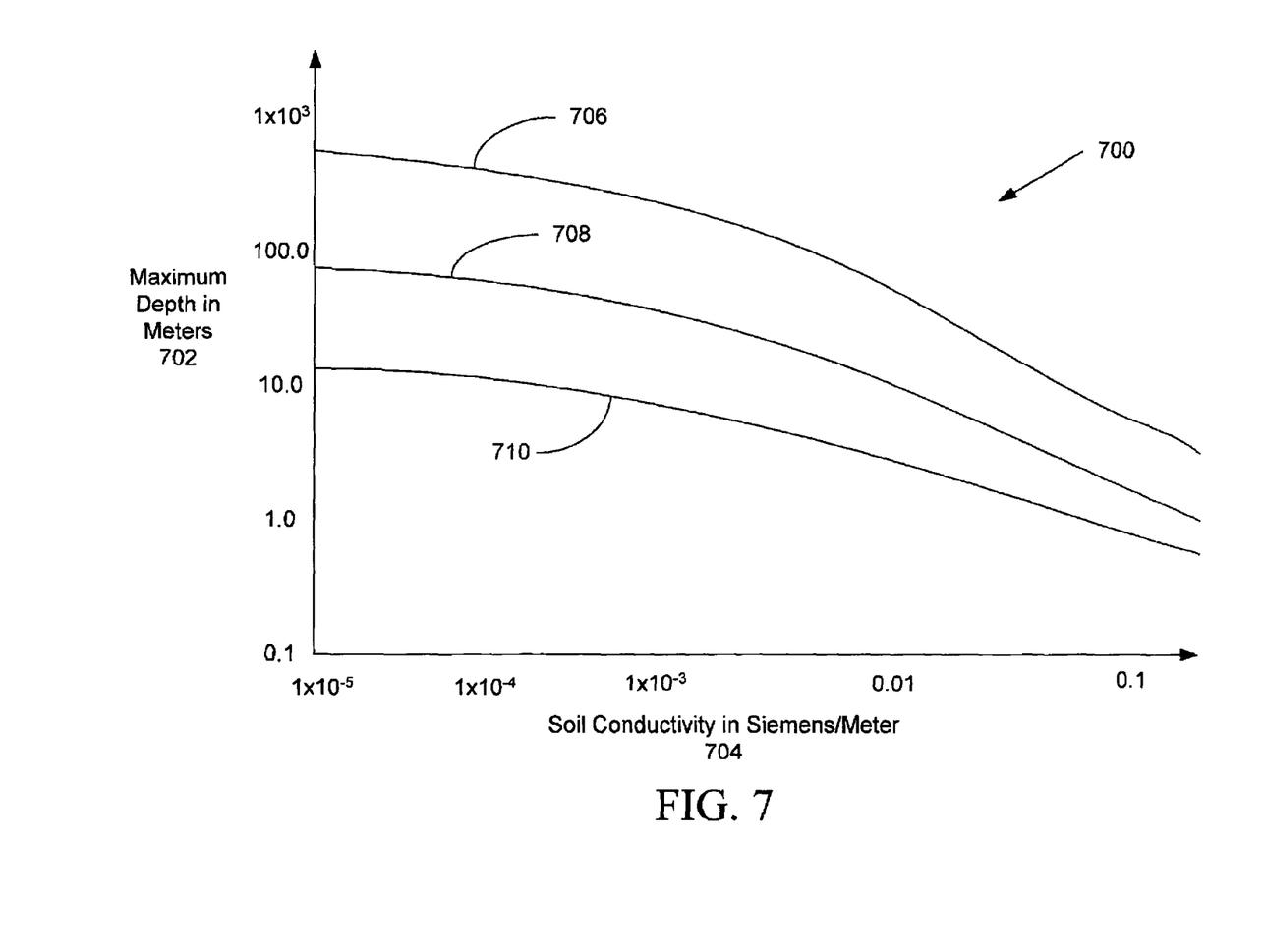
FIG. 7 is a graphical representation of a three plots of the maximum depth in meters versus soil conductivity in Siemens per meter for a signal transmitter such as the wireless device of FIG. 3.

FIG. 7 is a graphical representation of a three plots 700 of the maximum depth 702 in meters versus soil conductivity 704 in Siemens per meter for a signal transmitter such as the wireless device 100. The first curve 706 is for an operating center frequency of 10-megahertz. The second curve 708 is for an operating center frequency of 100-megahertz and the third curve 710 is for an operating center frequency of 500-megahertz.

It is appreciated that another possible implementation may utilize the radio beacon also as a repeater for a GPR. The incoming signal from the GPR will be re-transmitted by the radio beacon after a fixed delay, and will increase the radio power returned to the GPR, significantly increasing the detection depth range, compared to a purely passive mode.

The process in FIG. 4 may be performed by hardware or software. If the process is performed by software, the software may reside in software memory (not shown) in the mobile unit or cellular network server. The software in software memory may include an ordered listing of executable instructions for implementing logical functions (i.e., "logic" that may be implement either in digital form such as digital circuitry or source code or in analog form such as analog circuitry or an analog source such an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples "a non-exhaustive list" of the computer-readable medium would include the following: an electrical connection "electronic" having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claimed is:

1. A wireless device having a radio portion, the wireless device comprising:
   a beacon transmitter; and
   a controller in signal communication with the radio portion and the beacon transmitter, wherein the controller instructs the beacon transmitter to transmit a beacon location signal that includes positional information of the wireless device in response to the radio portion of the wireless device that is in receipt of a beacon activation signal where generation of the beacon activation signal is initiated by at least one pseudolite or basestation.

2. The wireless device of claim 1, wherein the beacon transmitter is an ultra wide band transmitter.

3. The wireless device of claim 2, wherein the beacon location signal is a modulated signal having a 10-megahertz carrier wave signal.

4. The wireless device of claim 2, wherein the beacon location signal is a modulated signal having a 50-megahertz carrier wave signal.

5. The wireless device of claim 2, wherein the beacon location signal is a modulated signal having a 100-megahertz carrier wave signal.

6. The wireless device of claim 1, further including a satellite position system receiver in signal communication with the controller, the satellite position system receiver capable of determining a position of the wireless device and the beacon transmitter capable of transmitting the determined position of the wireless device.

7. The wireless device of claim 6, wherein the satellite position system receiver includes a memory unit that stores the determined position of the wireless device.

8. The wireless device of claim 7, wherein the satellite position system receiver receives aiding information from the radio portion.

9. The wireless device of claim 8, wherein the wireless device is a personal digital assistant ("PDA").

10. The wireless device of claim 8, wherein the wireless device is a cellular telephone.

11. The wireless device of claim 10, wherein the radio portion is a code division multiple access ("CDMA") type of two-way radio.

12. The wireless device of claim 10, wherein the radio portion is a time division multiple access ("TDMA") type of two-way radio.

13. The wireless device of claim 10, wherein the radio portion is a frequency division multiple access ("FDMA") type of two-way radio.

14. The wireless device of claim 10, wherein the radio portion is a global system for mobile communications ("GSM") type of two-way radio.

15. The wireless device of claim 10, wherein the radio portion is a universal mobile telephone service ("UMTS") type of two-way radio.

16. The wireless device of claim 1, comprising:
a receiver for receiving a geolocation of the at least one pseudolite,
wherein the wireless device computes the positional information based on a received geolocation of the at least one pseudolite.

17. A method for producing a beacon location signal in a wireless device having a radio portion, where the beacon location signal includes positional information of the wireless device, the method comprising:
receiving a beacon activation signal from at least one pseudolite or basestation at the radio portion of the wireless device, where generation of the beacon activation signal is initiated by the at least one pseudolite or basestation; and
transmitting the beacon location signal in response to receiving the beacon activation signal.

18. The method of claim 17, wherein the beacon location signal is a modulated signal having a 10-megahertz carrier wave signal.

19. The method of claim 17, wherein the beacon location signal is a modulated signal having a 50-megahertz carrier wave signal.

20. The method of claim 17, wherein the beacon location signal is a modulated signal having a 100-megahertz carrier wave signal.

21. The method of claim 17, further including:
receiving satellite position system data with a satellite position system receiver;
determining a position of the wireless device with the satellite position system receiver; and
transmitting the determined position of the wireless device.

22. The method of claim 21, further including storing the determined position of the wireless device in a memory unit.

23. The method of claim 22, further including receiving satellite positioning system aiding information from the radio portion.

24. The method of claim 23, wherein the warless device is a cellular telephone.

25. A wireless device having a radio portion, the wireless device comprising:
a beacon transmitter; and
means for instructing the beacon transmitter to transmit a beacon location signal that includes positional information of the wireless device in response to the radio portion of the wireless device being in receipt of a beacon activation signal transmitted from at least one pseudolite or basestation, where the generation of the beacon activation signal is initiated by the at least one pseudolite or basestation.

26. The wireless device of claim 25, further including a satellite position system receiver in signal communication with the controller, the satellite position system receiver capable of determining a position of the wireless device and the beacon transmitter capable of transmitting the determined position of the wireless device.

27. The wireless device of claim 26, wherein the satellite position system receiver includes a memory unit that stores the determined position of the wireless device.

28. A wireless device having a radio portion, the wireless device comprising:
means for receiving a beacon activation signal transmitted from at least one psuedolite or basestation at the radio portion of the wireless device, where generation of the beacon activation signal is initiated by the at least one pseudolite or basestation; and
means for transmitting a beacon location signal that includes positional information of the wireless device in response to receiving the beacon activation signal.

29. The wireless device of claim 28, wherein the beacon location signal is a modulated signal having a 10-megahertz carrier wave signal.

30. The wireless device of claim 28, wherein the beacon location signal is a modulated signal having a 50-megahertz carrier wave signal.

31. The wireless device of claim 28, wherein the beacon location signal is a modulated signal having a 100-megahertz carrier wave signal.

32. The wireless device of claim 28, further including:
means for receiving satellite position system data with a satellite position system receiver;
means for determining a position of the wireless device with the satellite position system receiver; and
means for transmitting the determined position of the wireless device.

33. The wireless device of claim 32, further including means for storing the determined position of the wireless device in a memory unit.

34. The wireless device of claim 33, further including means for receiving satellite positioning system aiding information from the radio portion.

35. The wireless device of claim 34, wherein the wireless device is a cellular telephone.

36. A computer-readable medium having software for producing a beacon location signal that includes a positional information of a wireless device having a radio portion, the signal-bearing medium comprising:
logic configured for receiving a beacon activation signal transmitted from at least one pseudolite or basestation at the radio portion of the wireless device, where generation of the beacon activation signal is initiated by the at least one pseudolite or basestation; and
logic configured for transmitting the beacon location signal in response to receiving the beacon activation signal.

37. The computer-readable medium of claim 36, wherein the beacon location signal is a modulated signal having a 10-megahertz carrier wave signal.

38. The computer-readable medium of claim 36, wherein the beacon location signal is a modulated signal having a 50-megahertz carrier wave signal.

39. The computer-readable medium of claim 36, wherein the beacon location signal is a modulated signal having a 100-megahertz carrier wave signal.

40. The computer-readable medium of claim 36, the software further including:
   logic configured for receiving satellite position system data with a satellite position system receiver;
   logic configured for determining a position of the wireless device with the satellite position system receiver; and
   logic configured for transmitting the determined position of the wireless device.

41. The computer-readable medium of claim 40, the software further including logic configured for storing the determined position of the wireless device in a memory unit.

42. The computer-readable medium of claim 41, the software further including logic configured for receiving satellite positioning system aiding information from the radio portion.

43. The computer-readable medium of claim 42, wherein the wireless device is a cellular telephone.

* * * * *